United States Patent [19]

Takaoka et al.

[11] 4,149,785
[45] Apr. 17, 1979

[54] DIAPHRAGM-TYPE EXPOSURE CONTROL SYSTEM HAVING BRAKING ARRANGEMENT

[75] Inventors: Yukio Takaoka, Asaka; Yoshio Sawada, Tokyo, both of Japan

[73] Assignee: Asahi Kogaku Kogyo Kabushiki Kaisha, Tokyo, Japan

[21] Appl. No.: 881,132

[22] Filed: Feb. 24, 1978

[30] Foreign Application Priority Data

Mar. 1, 1977 [JP] Japan .................................. 52-22350
Mar. 2, 1977 [JP] Japan .............................. 52-25107[U]
Mar. 2, 1977 [JP] Japan .............................. 52-25108[U]

[51] Int. Cl.² ........................... G03B 7/08; G03B 9/06
[52] U.S. Cl. ........................................ 354/43; 354/271
[58] Field of Search ....................... 354/40, 41, 43, 44, 354/46, 252, 271, 272, 29, 30

[56] References Cited

U.S. PATENT DOCUMENTS 3,727,528  4/1973  Sato ........................................ 354/43
3,921,186  11/1975  Lermann .......................... 354/271 X Primary Examiner—Michael L. Gellner
Attorney, Agent, or Firm—Christie, Parker & Hale

[57] ABSTRACT

An exposure control operation involving diaphragm adjustment is performed in first and second phases. During the first phase, a drag mechanism controls the rate of change of diaphragm value. During the second phase, a braking mechanism cooperates with the drag mechanism to control the rate of change of diaphragm value.

6 Claims, 19 Drawing Figures

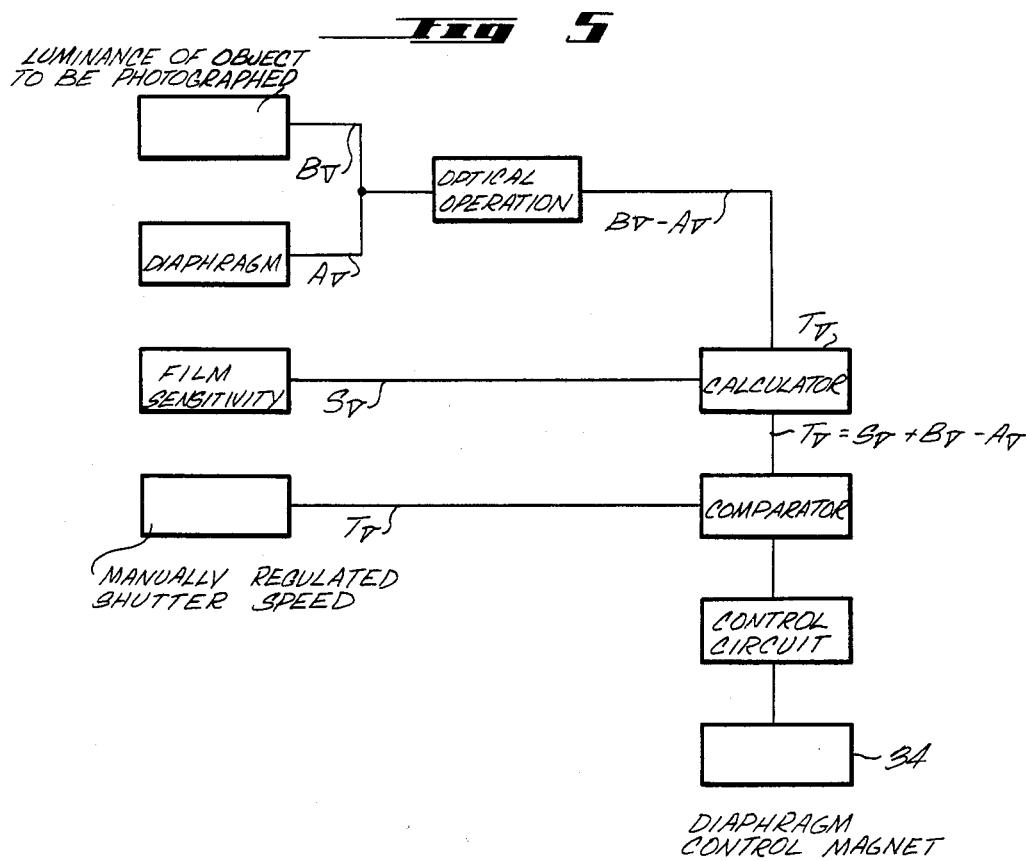
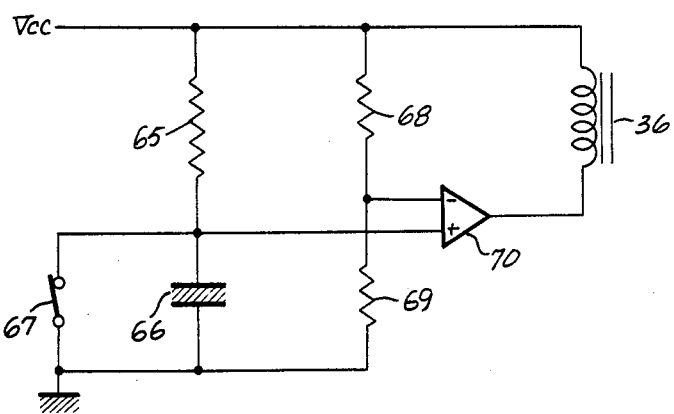

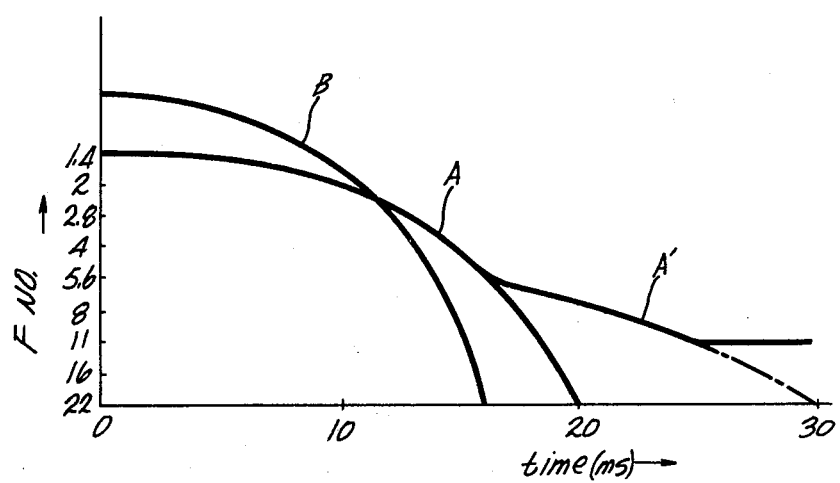

DIAPHRAGM-TYPE EXPOSURE CONTROL SYSTEM HAVING BRAKING ARRANGEMENT

BACKGROUND OF THE INVENTION

In general, this invention relates to a photographic camera having an exposure control system of the type that operates in cooperation with an adjustable-diaphragm lens used with the camera to controllably change diaphragm value so as to provide proper exposure. More particularly, it relates to an improved system arrangement involving a controllable brake mechanism.

Various types of automatic exposure control systems are well known in the photographic camera art. One such well known type of system referred to as the diaphragm value control type. In this type of system, the diaphragm value of an objective lens used with the camera is automatically controlled in accordance with exposure factors such as brightness of an object to be photographed, film sensitivity, and preset shutter speed.

During an exposure control operation performed by such a system, the amount of light coming through the lens aperture from the object to be photographed is determined with the objective being progressively stopped down from the opened state thereof and, when the appropriate diaphragm value is reached, the operation of stopping down is suspended so that proper exposure results when the shutter operates. A significant drawback of a conventional arrangement of such system will now be described. When an objective provided with a diaphragm mechanism of well known art is employed in the photographic camera of this type, it has been impossible to control the diaphragm mechanism with a high precision. One reason for this is that the time available to complete the exposure control operation, i.e., the time elapsing from the start to completion of stopping down, is excessively short. As a possible approach to this problem, one might try simply to associate a drag mechanism with the actuating members which are, in turn, operatively associated with operation of stopping down.

However, if such a drag mechanism is provided and so designed as to keep the speed of stopping down sufficiently slow to achieve the desired control with an adequate precison, the time of operation would be excessively long in many cases. This is particularly so in the cases in which it is desired to stop the lens down to the minimum diaphragm value or adjacent thereto. In other words, the time lag between depression of the shutter release button and actual opening of the shutter will be to long for practical picture-taking purposes. If the drag mechanism were so designed as to make its effect weaker with intent to overcome this problem, the particular advantage of providing such drag mechanism would be lost, although the time of operation could certainly be shortened.

In view of the foregoing, provision of a brake mechanism has been proposed so that diaphragm control might be achieved with a high precision in spite of relatively short total time of operation, but such a control has required a complicated circuit arrangement and has been encountered by various problems such as those with respect to cost and adjustment.

SUMMARY OF THE INVENTION

The present invention is directed to apparatus embodied in a photographic camera having a system that, during an exposure control operation, operates in cooperation with an adjustable diaphragm lens used with the camera to controllably change diaphragm value so as to provide proper exposure.

The apparatus comprises a movable system output member that, while diaphragm value is being changed, moves with a speed that determines the rate of change of diaphragm value. In specifically described embodiments, a slide plate serves as the system output member. The slide plate engages a lens member and the slide plate and lens member move together while diaphragm value is being changed.

The apparatus further includes circuit means for generating a brake initiation signal defining a transition from a first phase to a second phase of the exposure control operation. A drag mechanism portion of the apparatus operates during the exposure control operation to exert control over the speed of the output member. During the first phase, the drag mechanism imposes a first, relatively high-speed limit on the speed of the output member so as to define a first rate of change of diaphragm value.

The apparatus further includes a brake mechanism controlled by the brake initiation signal for causing the drag mechanism while operating during the second phase to impose a second, relatively low-speed limit on the speed of the output member so as to define a second rate of change of diaphragm value. The apparatus further includes means for locking the drag mechanism to terminate the exposure control operation when diaphragm value has been changed to a value appropriate for proper exposure.

In a first embodiment of the invention, the circuit means for generating the brake initiation signal comprises a timing circuit. Other advantageous features of the first and other embodiments are described in detail below and recited in the claims. For purposes of generally summarizing broad features of the other embodiments, it bears mention here that the present invention can be viewed as a diaphragm control arrangement for a photographic camera having an automatic exposure system of diaphragm control type. The system has a drag mechanism operatively is associated with actuating members which are, in turn, operatively associated with the operation of stopping the objective down from opened state thereof. The system achieves diaphragm value control by deenergizing a control magnet so as to stop operation of the drag mechanism, which includes a gear train. Distinguishing features reside in the arrangement wherein a brake wheel is fixed on a shaft of a gear of the gear train, and a brake member is adapted to exert a braking effect on the brake wheel. A brake magnet is provided, and when the brake magnet is deenergized, the braking effect is applied. A differentiation circuit is provided for timely differentiation of an output from a photometric circuit. An operational circuit is adapted to perform addition of the photometric circuit output and the differentiation circuit output. A comparator is adapted to compare the operational circuit output with a $T_v$ value. Upon conicidence, the brake magnet is deenergized thereby applying the braking effect.

Figure 7:
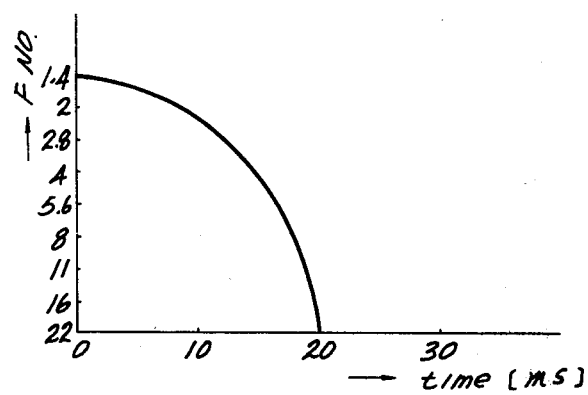
Figure 8:
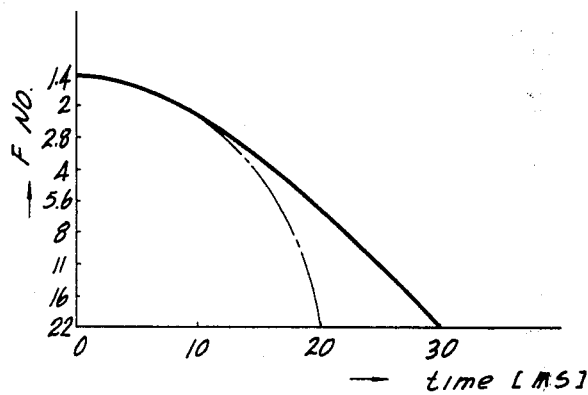
Figure 9:
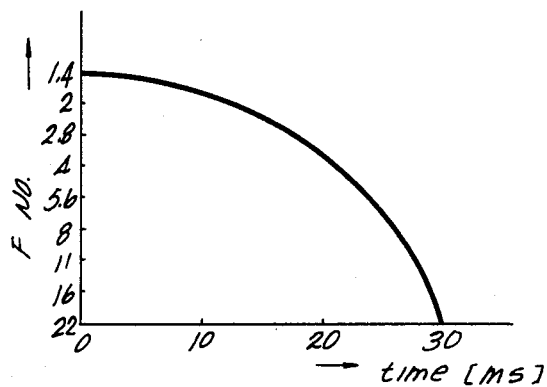
Figure 10:
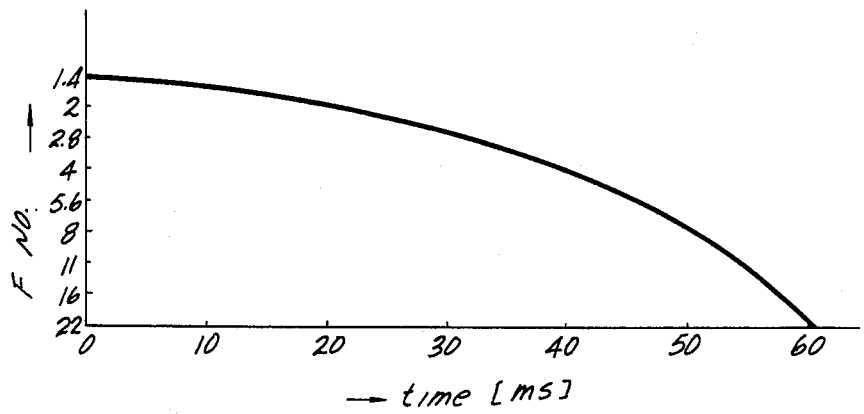
Figure 11:
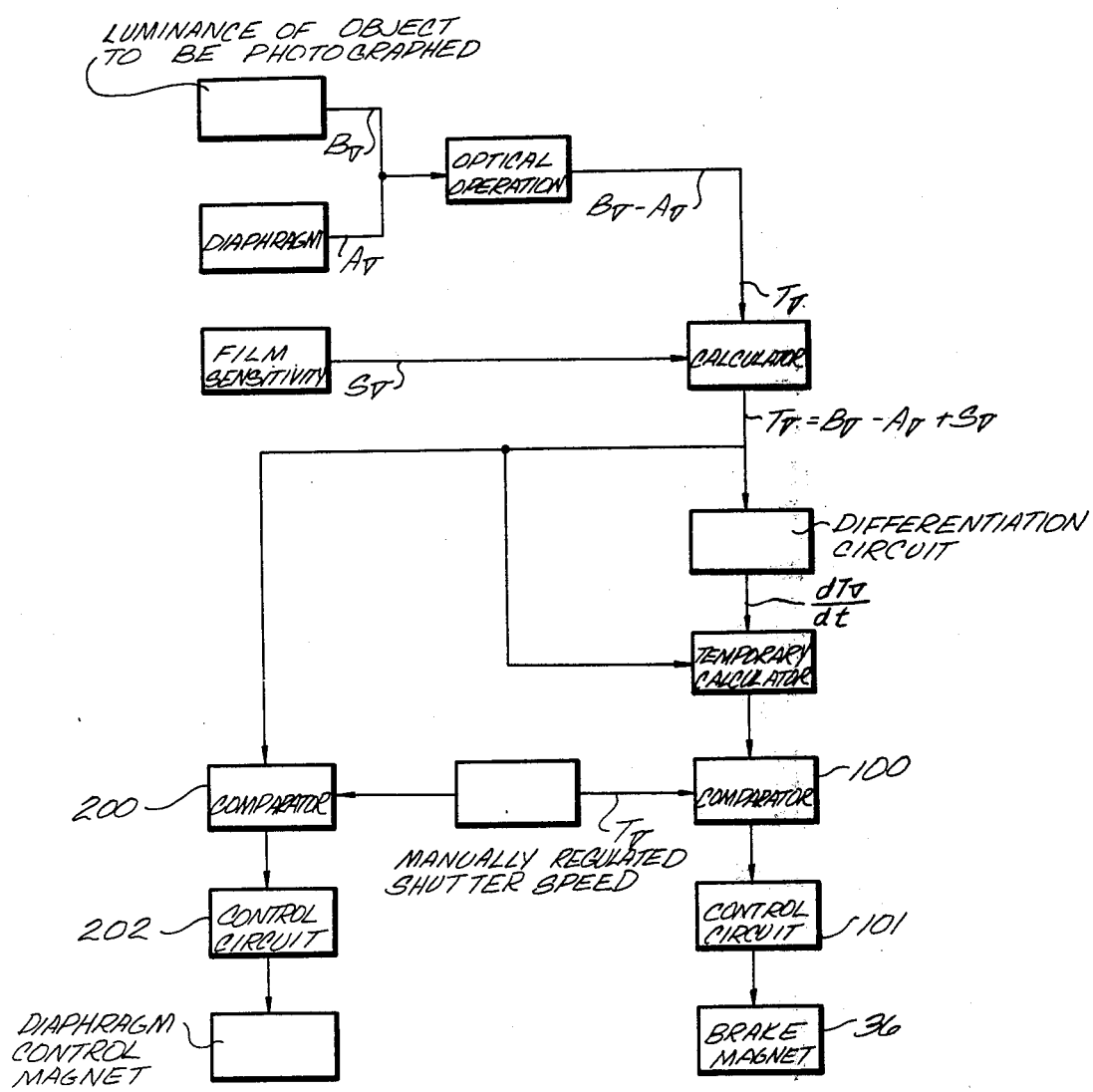
Figure 12:
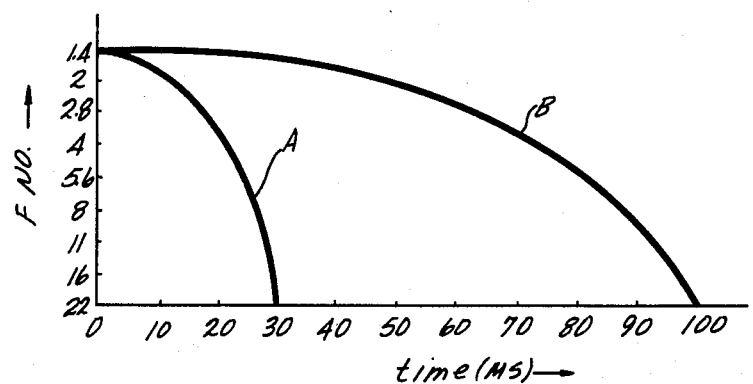
Figure 13:
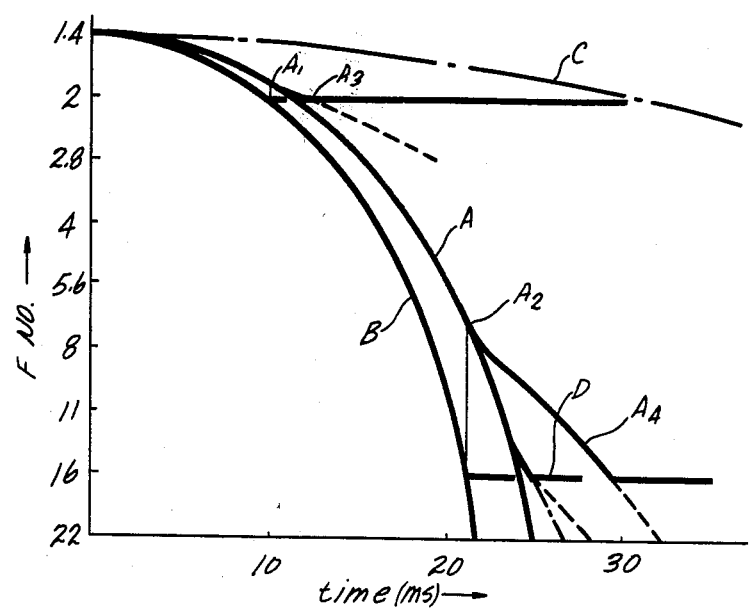
Figure 14:
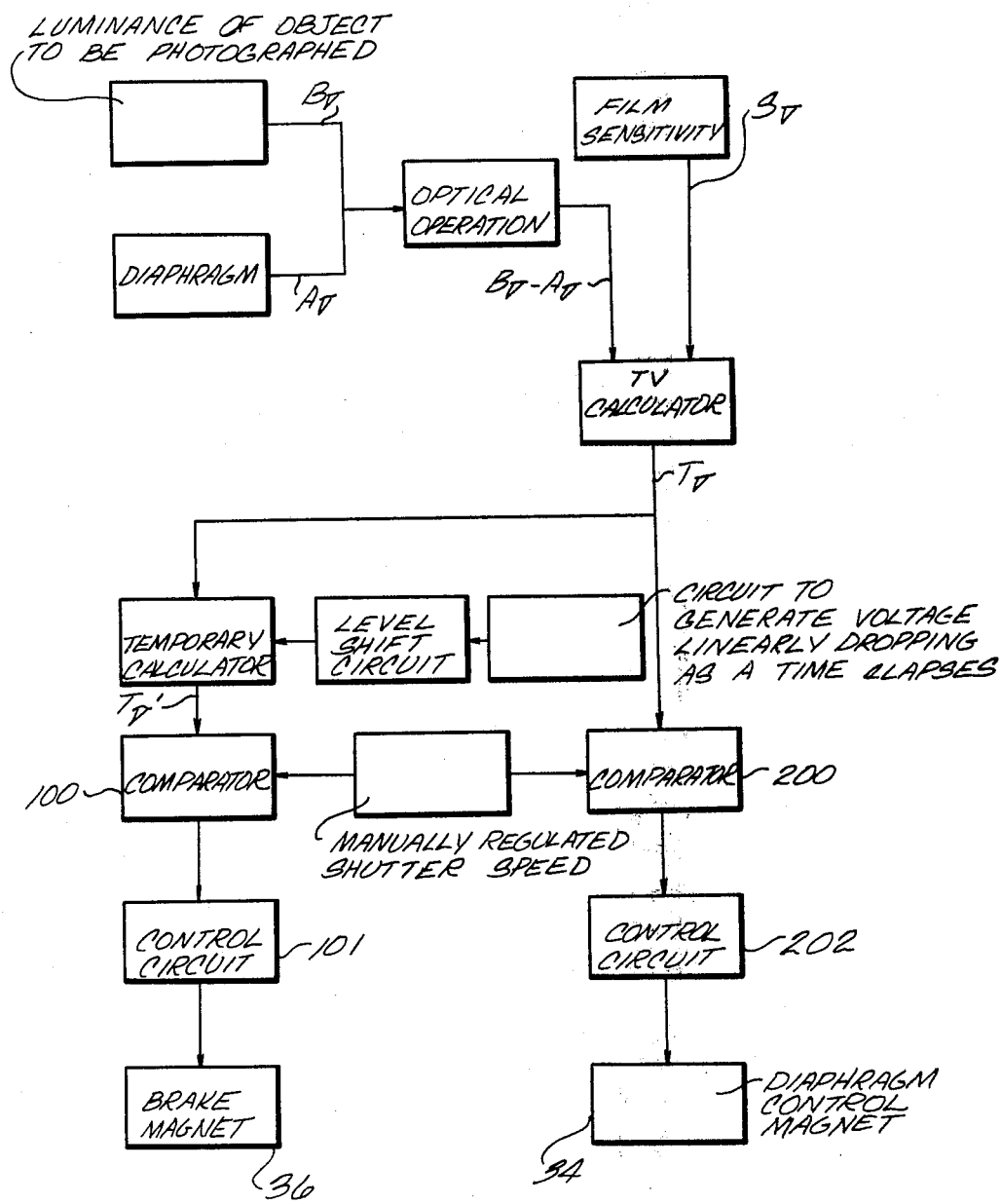
Figure 15:
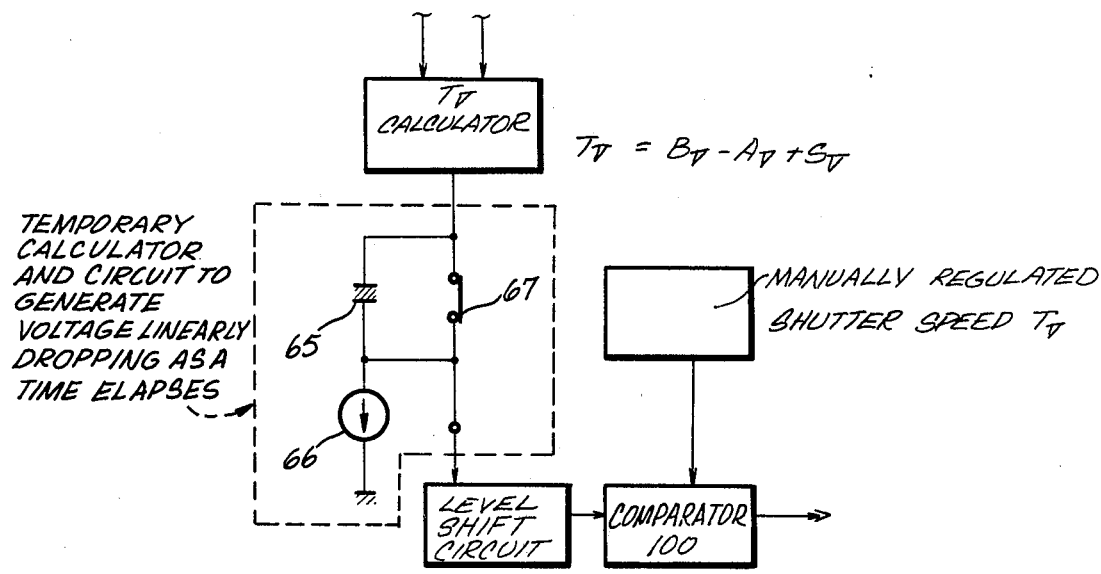
Figure 16:
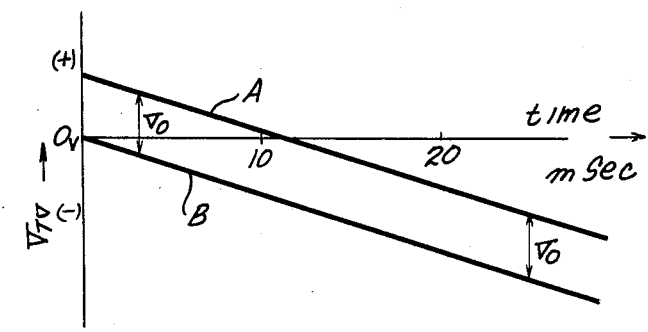
Figure 17:
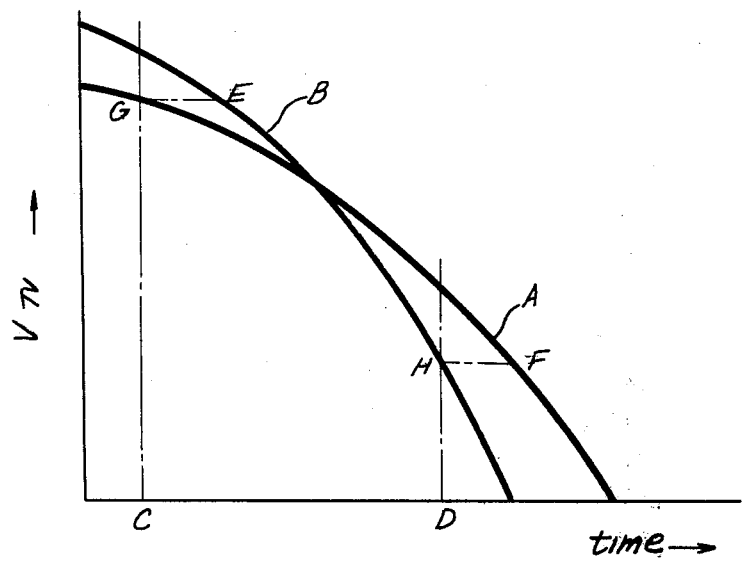
Figure 18:
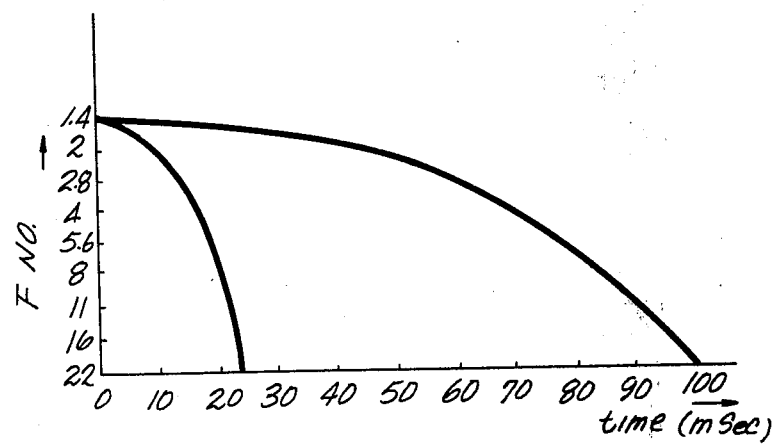

FIG. is a block diagram showing a first embodiment of a circuit arrangement for control of a diaphragm control magnet;

FIG. 6 is a circuit diagram showing a first embodiment of a timer adapted to regulate a moment at which a brake magnet starts to operate;

FIGS. 7, 8, 9 and 10 are each charts having time as the X axis and f number as the Y axis;

FIG. 7 assists in explaining the problem to which the invention is directed, and particularly shows, with respect to a photographic camera which has a drag mechanism but which lacks a brake device, the relationship between, on the one hand, a variation of light amount to which a photoconductive element is exposed (i.e., a variation in amount of stopping down), and, on the other hand, the time required for stopping down;

FIG. 8 shows, in comparison with FIG. 7, a performance advantage with respect to said first embodiment including the brake device;

FIG. 9 assists in explaining why a prior art drag mechanism, even if it were designed such that the total time it required to stop down were the same as the first embodiment, would lack the performance advantage provided by the invention;

FIG. 10 shows the disadvantageously long total time that would be required for stopping down if the brake device were to be activated upon initiation of stopping down;

FIG. 11 is a block diagram showing a second embodiment of the circuit arrangement for control of a diaphragm control magnet;

FIGS. 12 and 13 are each charts having the same X and Y axes as FIGS. 7-10;

FIG. 12 shows, with respect to the photographic camera having no brake device, a variation in amount of stopping down relative to a time of stopping down;

FIG. 13 is directed to showing a performance advantage with respect to a second embodiment including a brake device;

FIG. 14 is a block diagram showing a third embodiment of the circuit arrangement for control of a diaphragm control magnet;

FIG. 15 is a block diagram showing in detail a circuit adapted to generate a voltage linearly dropping together with components arranged in neighborhood of said circuits;

FIG. 16 is a chart showing in- and output voltage of the level shift circuit;

FIG. 17 is a chart showing a relationship between the $T_V$ value and the temporary $T_V$ value in the third embodiment;

FIG. 18 is a chart showing, with respect to the photographic camera including no brake device, a variation amount of stopping down relative to a time of stopping down; and FIG. 19 is a chart similar to FIG. 18 but with respect to said third embodiment including a brake device.

DETAILED DESCRIPTION

Figure 1:
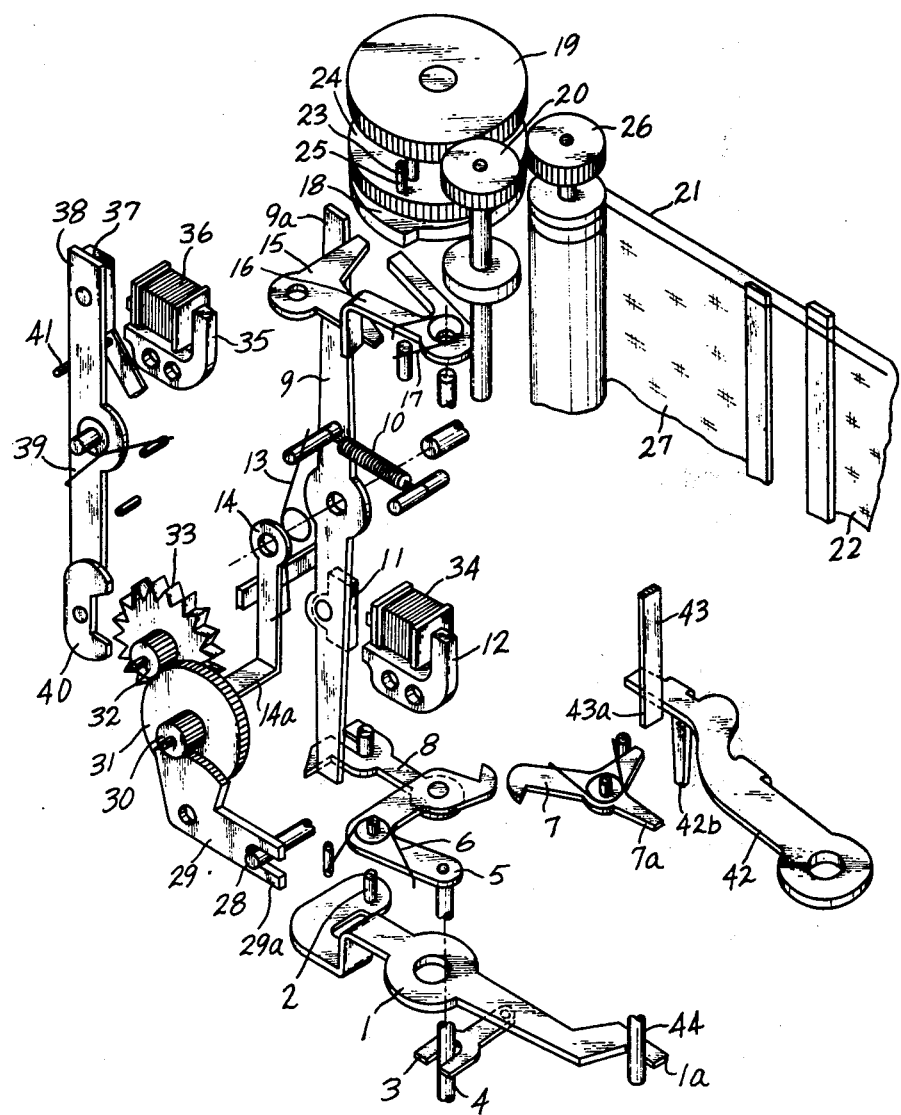
FIG. 1 is a perspective view showing a diaphragm value control mechanism, a drag-brake mechanism and a leading curtain release device.

Preferred embodiments of the present invention will be now described in detail with reference to the accompanying drawings. Reference is made first to FIG. 1 which illustrates a diaphragm value control mechanism, a drag-brake mechanism and a leading curtain release mechanism. A charge lever 1 is operatively associated by a charge pin 2 with a cam of a conventional transport mechanism (not shown). A pin 4 is engaged with a fork-like lever 3 rotatably mounted on charge lever 1 and adapted to rotate a set lever 5 against a force of a spring 6. Set lever 5 has one end configurated so as to be engaged by a locking lever 7. An actuator lever 9 has one of its ends located in the range within which an auxiliary lever 8 rotates. Auxiliary lever 8 is rotatably mounted on set lever 5. A spring 10 biases actuator lever 9 in a direction to bring actuator lever 9 into engagement with auxiliary lever 8. An armature 11 is pivotally mounted on actuator lever 9 and can be brought into contact with an iron core 12 of a diaphragm control magnet 34 fixed to the camera body. A control lever 14 provided coaxially with respect to actuator lever 9 is coupled by a spring 13 to lever 9. Actuator lever 9 has its end 9a engaged with a relay lever 15 against which a leading curtain locking lever 16 is always urged at one end by a spring 17. Leading curtain locking lever 16 has its other end located so as to be engaged with and disengaged from a leading curtain locking cam 18. An upper speed change gear 19 is positioned coaxially with respect to the leading curtain locking cam 18, and engages a gear of the above-mentioned conventional transport mechanism, and functions to transport a leading curtain 22 by a pulling cord 21 through a leading curtain pinion 20 engaged with upper speed change gear 19. When a pin 23 planted in the upper gear 19 engages a pin 25 planted on a lower speed change gear 24, gear 24 is rotated together with the gear 19 and a following curtain 27 is transported by a following curtain pinion 26.

In the drag-brake mechanism portion of the arrangement shown in FIG. 1, a coupling pin 28 is disposed within a slit 29a of a segment gear 29 which is, in turn, engaged with a first pinion gear 30 and drives, through a spur gear 31 and a second pinion gear 32, a planet wheel 33. Planet wheel 33 is adapted to be engaged with and disengaged from a locking portion 14a of control lever 14. To planet wheel 33, an ankle 40 is opposed, which is, in turn, pivotally mounted on an ankle lever 38 biased by a spring 39. An armature 37 pivotally mounted on ankle lever 38 is adapted to be brought into contact with an iron core 35 of a brake magnet 36. A pin 41 is planted on said not shown lever which is engaged with auxiliary lever 8 for setting. There is provided a clutch of one way type between first pinion gear 30 and spur gear 31 so that first pinion gear 30 cooperates with spur gear 31 to rotate planet wheel 33 as the coupling pin 28 moves upwards while the coupling pin 28 returns downwards to restore the diaphragm in the direction of opening thereof as planet wheel 33 is locked under a control.

Figure 2:
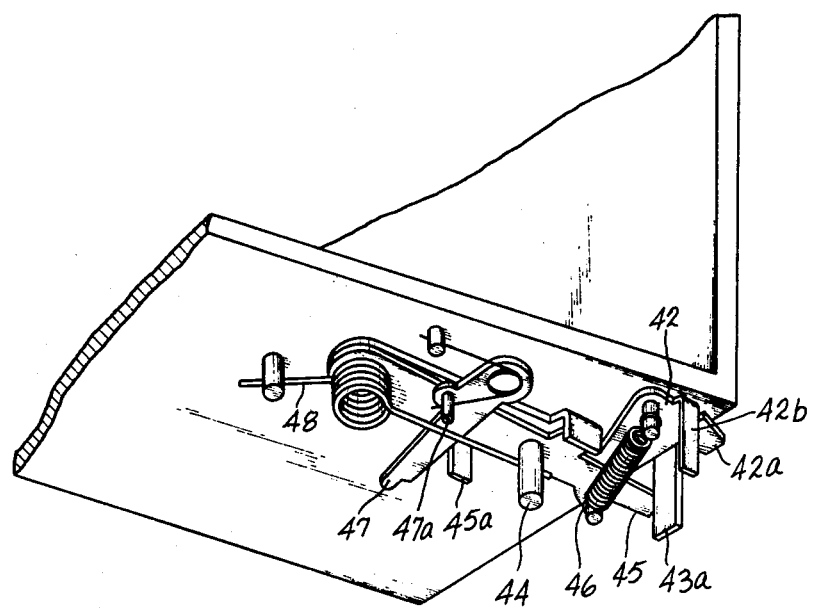
FIG. 2 is a perspective view showing a charge mechanism arranged on the bottom of a mirror box as seen from the rear side.

Reference is now made to FIG. 2 which shows the bottom surface of a mirror box from its rear side. A first actuator lever 42 is journaled in the box bottom and has a downwardly extending portion 42b adapted to be engaged with one end 7a of locking lever 7 as already mentioned in reference with FIG. 1. The first actuator lever 42 has one end 42a in engagement with one end 43a of a second actuator lever 43. The first actuator lever 42 is coupled by a spring 46 which biases the mirror upwards to a drive lever 45. A pin 44 on drive lever 45 is, as best shown in FIG. 1, engaged with one end 1a of charge lever 1. A locking lever 47 serves to lock the drive lever as charged against a force of a restoration spring 48.

Figure 3:
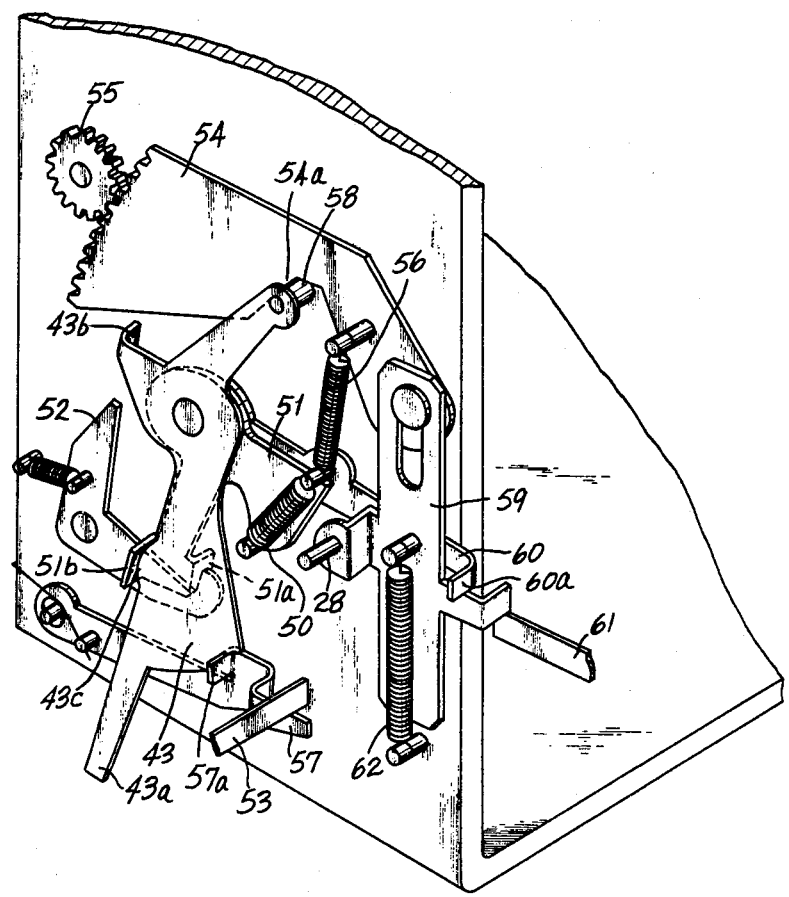
FIG. 3 is a perspective view showing a drive mechanism arranged on the side of the mirror box.

As shown in FIG. 3, a lever 51 is journaled coaxially with respect to the second actuator lever 43 and has its downward extending portion 51a locked by a locking lever 52. The second actuator lever 43 is adapted to be locked by a locking lever 57 and, when disengaged by a lever 53 operatively associated with the camera release button (not shown) from said locking lever 57, urges with a pin 58 fixed to one end thereof a cam portion 54a of a mirror lifting lever 54 and thereby rotates a mirror lifting gear 55. A slide plate 59 having the coupling pin 28 as previously mentioned in reference with FIG. 1 planted thereon and a slot is mounted by a shaft of the mirror lifting lever 54 and another pin for vertical displacement. A restoration lever 60 journaled coaxially with respect to the second actuator lever 43 and having an upward extending portion 60a in engagement with the slide plate 59 is coupled by a spring 50 to the lever 51, on one side, and coupled by a pring 56 to the mirror lifting lever 54, on the other side. A lens diaphragm release plate 61 is always biased in the direction such that the lens is stopped down, i.e., upwards as seen in FIG. 3. The slide plate 59 in engagement with said lens diaphragm release plate 61 is also biased upwards against a restoration spring 62 but held by said upward extending portion 60a. It bears mention here that slide plate 59, serves in the specifically described embodiment as the output member of the exposure control system. The speed with which it moves during an exposure control operation determines the rate of change of diaphragm value.

In the device according to the present invention with the arrangement as described hereinbefore, the drag-brake mechanism is charged in the following manner. Charge lever 1 is clockwise rotated and set lever 5 also is rotated in the same direction by fork-like lever 3 and pin 4, as a film transport is performed by the conventional transport mechanism, since charge pin 2 is engaged with the pin of said transport mechanism. This rotation of set lever 5 causes the shaft of auxiliary lever 8 for setting to be displaced rightwards and actuator lever 9 to be counterclockwise rotated against the force of spring 10. In consequence, armature 11, which is pivotally mounted on the actuator lever 9, comes into contact with iron core 12 of diaphragm control magnet 34. Control lever 14, which is coupled by spring 13 to lever 9, is also counterclockwise rotated and disengages from planet wheel 33w which is in the final stage of the drag-brake mechanism. Further displacement of an end 9a of actuator lever 9 causes leading curtain locking lever 16 to be clockwise rotated under action of spring 17 through the relay lever 15 and thereby to be ready for engagement with leading curtain locking cam 18. Simultaneously, pin 41, which is planted on the not shown lever in engagement with the auxiliary lever 8 for setting, causes ankle lever 38 to be clockwise rotated against the spring 39. As a result, armature 37, which is pivotally mounted on said ankle lever, is brought into contact with iron core 35 of auxiliary brake magnet 36 and ankle 40 is retracted from planet wheel 33. In such state where armatures 11 and 37 are in contact with iron cores 12 and 35, respectively, set lever 5 is engaged with locking lever 7. The cam of the transport mechanism is set so that charge lever 1 presents maximum rotational displacement in said state and further operation of transport causes charge lever 1 to restore to its initial position. Restoration of the charge lever 1 causes fork-like lever 3 to leave the pin 4 and to restore its initial position.

The shutter curtains are charged in the following manner. Rotation of upper speed change gear 19 engaged with the gear of the conventional transport mechanism causes pulling cord 21 to be taken up by the leading curtain pinion 20 engaged with said upper speed change gear 9 so as to charge the leading curtain 22. The pin, 23, which is planted on gear 19, is engaged with pin 25, which is planted on the speed change 24, and thereby gear 24 is rotated so that the following curtain 26 achieves charge of the following curtain 27. Upon completion of a transport, leading curtain locking cam 18, which is integrally coupled to the speed change gear 19, is engaged with leading curtain locking lever 16 which has been ready for this engagement.

Now the manner in which the mechanism provided on the bottom and side surfaces of the mirror box is charged will be described. The drive lever 45 (FIG. 2), which has pin 44 fixed thereon to be engaged with the end 1a of the charge lever 1, is clockwise rotated as seen in FIG. 2, charging both the restoration spring 48 and mirror lifting spring 46, as said charge lever 1 is rotated. The charge of said two springs 46 and 48 is completed when a locking portion 45a of said drive lever 45 comes in the locking lever 47. In this stage, mirror lifting spring 46 urges the first actuator lever 42 forwards with respect to the mirror box so that first actuator lever 42 urges with its end 42a the end 43a of the second actuator lever 43 to be displaced forwards. It will be seen, however, from FIG. 3 that lever 43 is locked by the upward extending portion 57a of the locking lever 57 and thereby held in this position. As previously described, lens diaphragm release plate 61 is always biased in the direction such that the lens is stopped down, i.e., upwards as seen in FIG. 3 and the slide plate 59 in engagement with said lens diaphragm release plate 61 is also biased upwards against the restoration spring 62 but held by said upward extending portion 60a.

After the respective mechanisms have been charged as described above, the camera release button is depressed so that release lever 53, which is operatively associated with the release button, is displaced downward as seen in FIG. 3. Thus, second actuator lever 43 is liberated from the locking effect of locking lever 57. Now, first actuator lever 42 is rotated by mirror lifting spring 46 clockwise as seen in FIG. 2 so as to rotate second actuator lever 43 forwards with respect to the mirror box. Then, pin 58, which is fixed to the second actuator lever 43, urges upwards cam portion 54a of mirror lifting lever 54, counterclockwise rotating the mirror lifting gear 55 engaged with the gear provided on the forward end of said lever 54, and thereby lifts the mirror (not shown). Towards the end of operation of the second actuator lever 43, i.e., towards the end of the mirror's upward movement, the upwardly extending portion 43b thereof strikes the locking lever 52 so as to remove its locking effect upon lever 51. As a result, the lever 51 and the restoration lever 60 is rotated upwards at once under action of the spring 56.

The slide plate 59 which has been held down by the restoration lever 60 now begins to be moved upwards, initiating stopping down of the lens diaphragm, and the drag-brake mechanism (FIG. 1) also begins to operate under action of the coupling pin 28 planted on the slide plate 59.

As first actuator lever 42 is rotated in response to depression of the release button, the upwardly extending portion 42b thereof strikes end 7a of locking lever 7, and thereby set lever 5, which has been locked by the lever 7, is counterclockwise rotated under action of spring 6. Simultaneously, actuator lever 9 and ankle lever 38 also are biased to rotate, but these two levers 9 and 38 are prevented from rotating, since the diaphragm control magnet and the brake magnet 36 have already been energized so that the armatures 11 and 37 have been attracted by these magnets, respectively.

Figure 4:
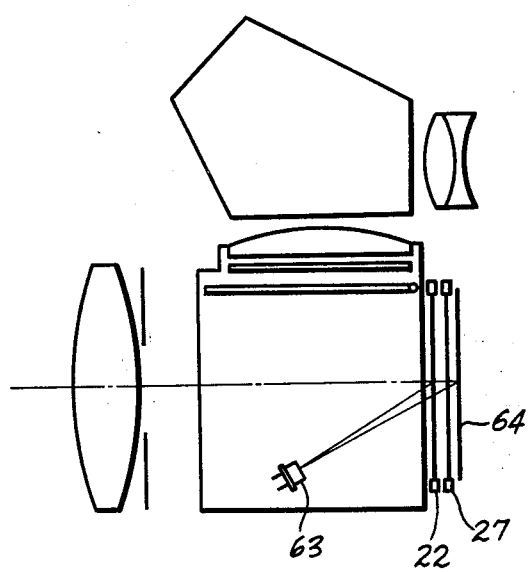
FIG. 4 is a schematic side view showing relative positions of the leading and following curtains of the shutter and an element adapted to be exposed to light coming from an object to be photographed.

Referring to FIG. 4, a description will be made here in connection with a circuit arrangement adapted to control the diaphragm value according to a variation in the amount of incident light due to the stopping down of the lens. A photoconductive element 63 adapted to be exposed to the incident light is located in lower portion of the mirror box. This location is selected because the mirror has already been moved upwards at the time point of stopping down, and the desired photometric operation could not be achieved if the element 63 were to be located, for example, adjacent the eye-piece of the viewfinder. The element 63 faces the focal plane so as to be exposed to the reflected rays coming from the leading curtain 22 of which the objective side is treated as a reflective surface and thereby to achieve the photometric operation with respect to the incident light passing through the objective. In FIG. 4, reference numeral 27 designates said following curtain and reference numeral 64 designates film.

An embodiment of the circuit arrangement including the photoconductive element and adapted to control the diaphragm value will be described in reference to the block diagram of FIG. 5. An apex calculation $B_V - A_V$ is optically conducted on the basis of the luminance $B_V$ of an object to be photographed and a variation of light amount according to the extent of stopping down $A_V$ and then the set film sensitivity $S_V$ is added to said $B_V - A_V$ to obtain the shutter speed $T_V = S_V + B_V - A_V$. This $T_V$ value depends moment by moment upon $B_V - A_V$ which varies, in turn, as the stopping down progresses, and is compared by a comparator with a preset $T_V$ value of the manually regulated shutter speed.

In accordance with a first embodiment of the invention, upon a brake initiation signal for initiation of stopping down, a timer circuit (FIG. 6) for generating the brake mechanism starts to operate. The timer circuit is provided independently of the circuit shown by FIG. 5 and comprises a delay circuit consisting of a resistor 65, a capacitor 66 serially connected to said resistor 65 and a switch 67 connected in parallel to said capacitor 66, a reference voltage circuit consisting of resistors 68 and 69 serially connected to each other, and a comparator 70, to which the reference voltage of the reference voltage circuit and the terminal voltage of the capacitor 66 are applied as the input, and the output from which serves to control the brake magnet 36. In this timer circuit, the terminal voltage $V_C$ of the capacitor 66 is expressed by $V_C = [1 - \exp(-t/CR_1)]V_{CC}$ and the reference voltage $V_S$ is expressed by $V_S = R_3 V_{CC}/R_2 + R_3)$, where $V_{CC}$ represents a source voltage, C a capacity of the capacitor 66, and $R_1$, $R_2$ and $R_3$ resistance values of the resistors 65, 68, and 69, respectively. The switch 67 is opened as soon as the diaphragm release plate 61 starts to move and the stopping down initiates, so that the comparator 70 deenergizes the brake magnet 36 upon the condition $V_C = V_S$ occurring a predetermined time after said switch 67 has been opened and thus the armature 37 is released. It will now be appreciated that the output signal of the timer circuit defines a transition between a first and second phase of the exposure control operation.

As a result, the ankle lever 38 is counterclockwise rotated under action of the spring 39 and the ankle 40 is engaged with the planet wheel 33 so as to impose a braking effect. Thus, the speed at which the diaphragm blades are driven in the direction of stopping down becomes slower and said diaphragm blades are further driven in the same direction until the operational $T_V$ value coincides with the preset $T_V$ value. The comparator detects this coincidence of both $T_V$ values and signals it to the control circuit to deenergize the diaphragm magnet 34. To this end, the iron core 12 releases the armature 11 and the actuator lever 9 is clockwise rotated under action of the spring 10. The control lever 14 coupled by the spring 13 to the actuator lever 9 is also clockwise rotated into engagement with the planet wheel 33 of the drag mechanism. In consequence, the planet wheel 33 is stopped and thereby the diaphragm release plate 61 also is stopped through the second pinion gear 32, the spur gear 31, the segment gear 29, the coupling pin 28 and the slide plate 59 so as to set the diaphragm to a right value. The actuator lever 9 continues to rotate with its end 9a urging the relay lever 15 and disengages the leading curtain locking lever 16 from the leading curtain locking cam 18, releasing the leading curtain 22 to run.

Circuit and mechanism of well known art for exposure time regulation, not shown, adapted to be activated in synchronization with the release of the leading curtain serves to set a time elapsing from said release of the leading curtain to the release of the following curtain. At the end of the running course, the following curtain strikes the pin 47a fixed to the locking lever 47 shown in FIG. 2 so as to be clockwise rotated and thereby releases the drive lever 45 from the locking effect. The drive lever 45 restores its initial position under action of the restoration spring 48 and thereby causes the second actuator lever 43 to restore its initial position. As shown in FIG. 3, the second actuator lever 43 urges with its projection 43c the upwardly extending portion 51b of the lever 51 to strain the coupling spring 50 and thereby to effect the restoration of the restoration lever 60. As a result, the slide plate 59 is moved downwards and the lens diaphragm also restores its opened state. It is because of provision of the one way clutch between the first pinion gear 30 and the spur gear 31 as previously mentioned that the slide plate can slide downwards although the planet wheel 33 is locked by the control lever 14. The mirror lifting lever 54 also is pulled by the spring 56 downwards and, therefore, the mirror also restores its initial position. The whole operation is completed by engagement of the lever 51 with the locking lever 52. Now the next film transport is ready.

In the diaphragm control operation as described hereinabove, the relationship between a variation of light amount to which the element 63 is exposed, which is converted into the corresponding diaphragm value, and a time of stopping down is illustrated by FIGS. 7, 8, 9 and 10, on the assumption that the lens diaphragm covers a range from F 1.4 to F 22 and the auxiliary brake is adapted to provide its effect, starting from 10 ms. FIG. 7 particularly illustrates a condition under which no braking effect is obtained. An amount of displacement of the lens diaphragm release plate 61 per 1 EV is generally smaller adjacent the minimum diaphragm value than adjacent the value corresponding to the fully opened diaphragm. Even if the diaphragm release plate 61 is displaced substantially at a constant speed, the variation of light amount plots a sudden curve adjacent the minimum diaphragm value. In the example as shown by FIG. 7, a time of 0.5 ms is taken to stop the lens from F 16 to F 22. However, if the moment at which the diaphragm control magnet 34 is activated deviates by 0.5 ms, the exposure would involve an indefiniteness of $\pm$ 1 EV; this of course fails to provide effective exposure control.

FIG. 8 illustrates a case where there is provided a brake device. In this case, a braking effect commences 10 ms after the stopping down has been started and a time of 2.5 ms is taken to stop the lens from F 16 down to F 22. This means that, even when operation of the diaphragm control magnet 34 deviates by 0.5 ms, the over- or under-exposure will be limited approximately to 1/5 EV.

In the example of FIG. 9 where the same time of stopping down as in the example of FIG. 8 is obtained only by use of a heavy drag device, the time per 1 EV on the side of the minimum diaphragm value is not excessively prolonged regardless of a considerable prolongation of the total time of stopping down, so that no correct control can be expected. In the example of FIG. 10 where a braking effect is activated as early as from the initial stage of stopping down, on the other hand, an inadequate initial speed of stopping down would result in a total time of stopping down excessively long for a practical use, since there is already present said braking effect.

Although the moment at which the brake device is activated is set to 10 ms after the start of stopping down in the example of FIG. 8, this moment may be set to the optimum time depending upon the type of used objective, so far as the resistance value $R_1$ of the resistor 65 as shown in FIG. 6 is variable.

It will therefore be appreciated that the photographic camera having both the drag mechanism and the braking means according to the present invention, as described hereinabove, provides the advantage of an adequately accurate control of the diaphragm value and yet avoid the disadvantage of excessively prolonging the total time of stopping down. In addition, the moment at which the braking means begins to be activated can be freely adjusted in cooperation with an extremely simple circuit arrangement for this purpose so that the optimum time of stopping down may be obtained depending on the type of interchangeable objective lens being used with the camera. Another embodiment of the circuit arrangement for control of diaphragm value will now be described with initial reference to the block diagram of FIG. 11. In conventional manner, an apex calculation $B_V - A_V$ is optically conducted on the basis of the luminance $B_V$ of an object to be photographed and a variation of light amount according to the extent of stopping down $A_V$, and then the set film sensitivity $S_V$ is added to said $B_V - A_V$ to obtain the shutter speed $T_V = S_V + B_V - A_V$. This $T_V$ value depends moment by moment upon $B_V - A_V$ which varies, in turn, as the stopping down progresses, and is compared by a comparator 200 with a preset $T_V$ value of the manually regulated shutter speed. Simultaneously, a differentiator shown in FIG. 11 provides, as its output, a differential coefficient at every moment. A temporary $T_V$ calculator performs a calculation based on this output indicative of differential coefficient and an output from a $T_V$ calculator which, in turn, calculates an output indicative of light amount variation depending on how far the stopping down has progressed. The output from said temporary $T_V$ calculator and the manually regulated shutter speed are also compared to each other in a comparator 200. The temporary $T_V$ value is calculated so that an effective braking may be obtained before the lens is stopped down to a right diaphragm value. This temporary $T_V$ value comes earlier than the $T_V$ value given by the $T_V$ calculator into coincidence with the manually regulated shutter speed $T_V$, since the temporary $T_V$ calculator performs the calculation in a manner such that the temporary $T_V$ value corresponds to a voltage lower than that corresponding to the $T_V$ value given by the $T_V$ calculator. The fact as has been mentioned above can be expressed by a series of numerical formulae as successively set forth later.

Referring to FIG. 13, a curve A plots the $T_V$ value obtained from calculation based on the output of the photometric circuit and corresponds to $V_{TV}$ while a curve B plots the temporary $T_V$ value and corresponds to $V_{TV}$, which, in turn, corresponds to the differential coefficient $dV_{TV}/dt$ obtained by differentiation of said $T_V$ value given by the $T_V$ calculator plus this $T_V$ value corresponding to $V_{TV}$. This is expressed by $$V_{TV}' = V_{TV} + T \cdot dV_{TV}/dt$$

where T is a constant as a function of time, and difference between the $T_V$ value and the temporary $T_V$ value is adjustable by selection of T. Here, $V_{TV}$ is a decreasing function and, therefore, $dV_{TV}/dt$ is negative. Thus a relationship $V_{TV}' < V_{TV}$ is established. It should be noted here that the relationship $A_V = B_V - T_V + S_V$ is used in the chart of FIG. 13 and both $B_V$ and $S_V$ will be constant under a fixed condition. The chart is accordingly graduated in $A_V$ on the assumption of the relationship $A_V = -T_V + C$ (C: Constant).

When the comparator 100 detects the coincidence between the manually regulated shutter speed $T_V$ and the temporary $T_V$, a control circuit 101 is activated to deenergize the brake magnet 36. As a result, the attracting effect of the iron core 35 upon the armature 37 is removed, the ankle lever is counterclockwise rotated under action of the spring 39, the ankle is brought into engagement with the planet wheel 33 with a braking effect, and the diaphragm blades are displaced more and more slowly in the direction of stopping the lens down until the $T_V$ is given by the $T_V$ calculator and the manually regulated shutter speed $T_V$ coincide with each other in the comparator 200. In response to this coincidence, the diaphragm control magnet 34 is deenergized under the action of a control circuit 202. The manner in which the mechanism further operates is identical to that which has already been described with respect to the first embodiment.

FIGS. 12 and 13 graphically show, in connection with the manner of diaphragm control as mentioned above, the light amount variation to which the element 63 is exposed and which has been converted into the corresponding diaphragm value as a function of the time. It should be noted here that these figures have been obtained on the basis of an objective having the lens aperture range from F 1.4 to F 22.

FIG. 12 particularly shows, with respect to the case where no brake devicew is included, a light amount variation curve A appearing when a light drag mechanism is employed to shorten the total running time (to 30 ms) and another light amount variation curve B appearing when the total running time has been prolonged (to 100 ms) for an improved precision. Amount of displacement of the diaphragm release plate per 1 EV is generally smaller adjacent the minimum diaphragm value than adjacent the position at which the diaphragm is fully opened. Even when the diaphragm release plate is moved substantially at a constant speed, accordingly, the light amount variation becomes abrupt adjacent the minimum diaphragm value. In the example A, a time of 0.8 ms is taken to stop the lens down from F 16 F 22. If the diaphragm control magnet 34 presents a timely erroneous operation by 0.5 ms, no effective control will be achieved at all. In the other example B wherein the total running time has been prolonged to improve the precision, on the other hand, a time of 3 ms is taken to stop the lens down from F 16 to F 22, and, even if said diaphragm control magnet presents a timely erroneous operation by 0.5 ms, such erroneous operation corresponds only to 1/6 EV. In the example B, however, a serious problem arises when a right diaphragm value lies in a neighborhood of F 22, so far as a commonly used single lens reflex camera is concerned, since a time required for control is added to the time delay from the release to the operation of the shutter, resulting in a large time delay for the shutter chance.

FIG. 13 shows characteristic curves of the drag mechanism including the brake device according to the present invention. The total running time will be 25 ms without activation of the brake device (the curve A). Conversion of a temporary $T_V$ calculated according to a speed of stopping down at each point along the curve A into the corresponding diaphragm value provides the curve B. The curve A represents actual diaphragm values and the brake device is controlled in accordance with the curve B. There is a difference in order of 0.4 EV between a point $A_1$ on a portion of the curve A presenting a gentle variation and the corresponding point on the curve B. Such difference increases approximately to 2.5 EV as the point displaces along the curve A from said point $A_1$ to another point $A_2$ which lies on another portion of said curve A presenting a steep variation. If F 2 is to provide a right exposure, the comparator 100 causes the control circuit 101 to deenergize the brake magnet when the temporary $T_V$ of the curve B reaches the level of F 2. The curve is still presenting a gentle variation, so that the variation becomes further gentle under action of the brake device as represented by a curve $A_3$. However, there is a difference as small as 0.4 EV between the calculated $T_V$ (curve A) and the temporary $T_V$ (curve B), so that said curve $A_3$ soon reaches the level of F 2. Now the comparator 200 causes the control circuit 202 to deenergize the diaphragm control magnet so as to stop movement of the diagragm at F 2. If F 16 is to provide a right exposure, on the other hand, the comparator 100 causes the control circuit to deenergize the brake magnet when the temporary $T_V$ of the curve B reaches the level of F 16, and thus an effective braking is obtained. The curve A is already presenting a steep variation and, therefore, an influence of the braking effect is not so remarkable as represented by a curve $A_4$ which is, however, more gentle than the curve A, i.e., approximately 3 ms per 1 EV. When the level of F 16 is reached, the comparator 200 causes the control circuit 202 to deenergize the diaphragm control agent and a diaphragm control is effected so as to stop movement of the diaphragm of F 16. Although approximately 30 ms is taken to complete the desired control just as in the case A of FIG. 12, the precision is as high as in the case B of FIG. 12. If the difference between the $T_V$ and the temporary $T_V$ is large and constant at 2.5 EV, certainly no problem is encountered when the control is to take place at F 16 but the time required for the control will be excessively long when the control is to take place at F 2.8, since the diaphragm is in open state at 2 EV and the brake device is activated as early as at the point having no initial speed and an excessively gentle variation occurs as represented by C in FIG. 13. If the difference between the $T_V$ and the temporary $T_V$ is small and constant at 0.4 EV, no problem is encountered when the control is to take place at F 2 but no improvement of the precision is achieved when the control is to take place at F 16, since the control is performed as early as at the point still presenting a steep variation as seen from the curve D (certainly a gentle curve is obtained as represented by a broken line if no control is performed along the curve D, but a tangent at the control point would present a considerably steep slope as represented by a single dotted chain line).

It will be appreciated from the aforegoing description that, in accordance with the present invention, the brake magnet 36 is deenergized a time, depending upon the particular speed of stopping down, before movement of the diaphragm is actually stopped at a right exposure. The arrangement according to the present invention an be adapted for exchangeable objectives of different speeds of stopping down and enables the diaphragm control of high precision in spite of relatively short total running time.

Still another embodiment of the control circuit arrangement is illustrated as a block diagram in FIG. 14. In conventional manner, an apex calculation $B_V - A_V$ is optically conducted on the basis of the luminance $B_V$ of an object to be photographed and a variation of light amount depending upon the extent of stopping down $A_V$, and then the set film sensitivity $S_V$ is added to said $B_V - A_V$ to obtained the shutter speed $T_V = S_V + B_V - A_V$. This $T_V$ value depends moment by moment upon $B_V - A_V$ which varies, in turn, as the stopping down progresses, and is compared by the comparator 200. Simultaneously, the output from a circuit adapted to generate a voltage linearly dropping as the time elapses as indicated in the block diagram of FIG. 14 and the output from the temporary $T_V$ calculator adapted to perform addition of the calculated $T_V$ value are compared in the comparator 100 with the $T_V$ value of the manually regulated shutter speed.

Said circuit indicated in the block diagram of FIG. 14, which is adapted to generate the voltage linearly dropping as the time elapses has an arrangement such as illustrated by FIG. 15, and the terminal voltage of the capacitor is defined by a formula $$V_C = \frac{1}{C} \int_0^t I(t)dt.$$

The output from this circuit presents a variation as represented by a curve B in FIG. 16, since I(t)=Constant and, therefore, $V_C = 1/C$ It. In FIG. 15, SW designates a switch adapted to be turned off upon start of stopping down so that this start of stopping down may correspond to the original point of time. A circuit indicated by a broken line corresponds to TEMPORARY CALCULATOR and CIRCUIT TO GENERATE VOLTAGE LINEARLY DROPPING AS A TIME ELAPSES shown in FIG. 14. Since the level shift circuit can be provided at any place between the comparator 100 and the circuit to generate voltage linearly dropping so long as it shifts a signal of voltage linearly dropping, and in FIG. 15 the level shift circuit is provided immediately before the comparator 100. The output represented by the curve B in FIG. 16 is level-lifted in a level shift circuit by a predetermined value $V_o$ so as to present a curve A in FIG. 16. The temporary $T_V$ calculator adds this value to the calculated $T_V$ value. Thus, a relationship as following is established.

$$V_{TV} = V_{TV} - Kt + V_o$$

where $V_{TV}$ represents the output of the calculated $T_V$ value, $V_{TV}$ the output from the temporary $T_V$ calculator and K a constant. These calculated $T_V$ value and temporary $T_V$ value are graphically plotted commonly in FIG. 17, in which the curve A corresponds to the calculated $T_V$ value while the curve B corresponds to the temporary $T_V$ value. In the case where the temporary $T_V$ value has a level lower than that of the calculated $T_V$ value, the control (at the point D) is such that, upon coincidence of the $T_V$ value of the manually regulated shutter speed with the temporary $T_V$ value in the comparator 100, the brake magnet 36 is deenergized. As a result, the armature 37 is free from attracting effect of the iron core 35, the ankle lever is counterclockwise rotated under action of the spring 39, the ankle 40 comes into engagement with the planet wheel 33 so as to activate the brake device, the displacement of the diaphragm blades is progressively braked, and the objective is further stopped down until the calculated $T_V$ value comes in coincidence in the comparator 200 with the $T_V$ value of the manually regulated shutter speed (at the point H). Upon coincidence of both values, the diaphragm control magnet 34 is deenergized under action of the control circuit 202. The manner in which the mechanism further operates is identical to that which has already been described with respect to the first embodiment.

Referring to FIG. 17 again, the contrary case where the temporary $T_V$ value has a level higher than that of the calculated $T_V$ value (control at the point C) will be described. The calculated $T_V$ value comes in coincidence in the comparator 200 with the $T_V$ value of the manually regulated shutter speed (at the point G). Upon coincidence of both values, the diaphragm control magnet 34 is deenergized under action of the control circuit 202. The manner of control to be performed thereafter is just as previously mentioned. Although the calculated $T_V$ value becomes constant upon completion of the operation of stopping down, the temporary $T_V$ continues to decrease. Upon coincidence of the $T_V$ value of the manually regulated shutter speed with the temporary $T_V$ (at the point E), the comparator 100 causes the control circuit 101 to deenergize the brake magnet 36 and, as a result, the brake device would otherwise be activated, but actually never be activated, since the control has already been completed and the planet wheel 33 is locked.

In view of the fact that, if $B_V + S_V$ takes a predetermined value, the relationship $A_V = B_V + SV - T_V$ can be rewritten into $A_V = C - T_V$ (C: a constant), the light amount variation to which the element 63 is exposed and which has been converted into the corresponding diaphragm value as a function of the time is graphically shown, in connection with the manner of diaphragm control as mentioned above, by FIGS. 18 and 19. It should be noted here that these figures have been obtained on the basis of an objective having the lens aperture range from F 1.4 to F 22.

FIG. 18 particularly shows, with respect to the case where no brake device is included, a light amount variation curve A appearing when a light drag mechanism is employed to shorten the total running time (to 24 ms) together with another light amount variation curve B appearing when the total running time has been prolonged (to 100 ms) for improvement of the precision.

Amount of displacement of the diaphragm release plate per 1 EV is generally smaller in neighborhood of the minimum diaphragm value than adjacent the position at which the diaphragm is fully opened. Even when the diaphragm release plate is moved substantially at a constant speed, accordingly, the light amount variation becomes abrupt adjacent the minimum diaphragm value. In the example A, a time of 1 ms is taken to stop the lens down from F 16 to F 22. If the diaphragm control magnet 34 presents a timely erroneous operation by 0.5 ms, no effective control will be achieved at all. In the other example B wherein the total running time has been prolonged to improve the precision, on the other hand, a time of 5 ms is taken to stop the lens down from F 16 to F 22, and, even if said diaphragm control magnet presents a timely erroneous operation by 5 ms, such erroneous operation corresponds only to 1/10 EV. In the example B, however, a serious problem arises when a right diaphragm value lies in the neighborhood of F 22, so far as a commonly used single lens reflex camera is concerned, since a time required for control is added to the time delay from the release to the operation of the shutter, resulting in a large time delay for the shutter chance.

FIG. 19 shows characteristic curves of the drag mechanisms including the brake device according to the present invention. The total running time is 20 ms so far as the curve A is concerned. The curve B plots the temporary $T_V$ obtained by adding the output from the circuit adapted to generate voltage linearly varying as the time elapses to said curve A. Assumed that the diaphragm value F 11 is to provide a right exposure, the curve B reaches the level of F 11 first of all and thereupon the brake device is activated before 2.5 EV, reducing the speed in the manner as represented by the curve A'. Thus, the speed of approximately 1 ms/1 EV along the curve A is reduced to an order of 4 ms/1 EV along the curve A'. In consequence, the control is achieved with a high precision at the point when the curve A' reaches the level of F 11. The time required for completion of control is as short as 25 ms and the precision obtained in as high as that obtained in the example of FIG. 18, in which the total running time is 100 ms. Even when the diaphragm control magnet presents a timely erroneous operation by 0.5 ms, this corresponds only to ⅛ EV. In the case where the diaphragm value of F 2 is to provide a right exposure, the curve A reaches the level of F 2 earlier than the curve B whereupon the diaphragm control magnet is cut off and the diaphragm control is performed. Thereafter the curve B reaches the level of F 2, but the control has already been completed. Differences between the curve A and the curve B are 0.8 EV at F 4, 2 EV at F 8 and 4 EV at F 22, so that the braking effect is obtained more rapidly along the latter half course of accelerated speed. Along the first half course terminating approximately at F 2.5, on the contrary, the diaphragm control is achieved before activation of the brake device, namely, without a waste of time.

It will be appreciated from the aforegoing description that, in accordance with the present invention, only the control is performed along the first half course of a gentle variation while the brake device is operated at the speed in direct proportion to the speed of the diaphragm along the latter half course of a steep variation so that diaphragm control may be achieved at a high precision in spite of short total running time.

What is claimed is:

1. In a photographic camera having a system that, during an exposure control operation, operates in cooperation with an adjustable-diaphragm lens used with the camera to controllably change diaphragm value so as to provide proper exposure, apparatus comprising:
   a movable system output member that, while diaphragm value is being changed, moves with a speed that determines the rate of change of diaphragm value;
   circuit means for generating a brake initiation signal defining a transition from a first phase to a second phase of the exposure control operation;
   a drag mechanism operative during the exposure control operation to exert control over the speed of the output member, the drag mechanism while operating during the first phase imposing a first, relatively high-speed limit on the speed of the output member so as to define a first rate of change of diaphragm value;
   a brake mechanism controlled by the brake initiation signal for causing the drag mechanism while operating during the second phase to impose a second, relatively low-speed limit on the speed of the output member so as to define a second rate of change of diaphragm value; and
   means for locking the drag mechanism to terminate the exposure control operation when diaphragm value has been changed to a value appropriate for proper exposure.

2. Apparatus according to claim 1, wherein the drag mechanism includes a rotating mass, and wherein the brake mechanism includes a gear coupled to rotate with the rotating mass during the exposure control operation, and a member adapted to engage the gear so as to slow the rotation thereof during the second phase.

3. Apparatus according to claim 2, wherein the brake mechanism includes a brake control magnet responsive to the brake initiation signal for controlling the engagement of said gear and member.

4. A diaphragm control arrangement for a photographic camera having an automatic exposure system of diaphragm value control type, the system having a drag mechanism including a gear train that operates while the objective is being stopped down from opened state thereof;
   a diaphragm control magnet;
   a diaphragm value control circuit responsive to light coming through the lens aperture from an object to be photographed to deenergize the diaphragm control magnet when the objective has been stopped down to a right value for exposure factors such as a preset film sensitivity and a preset shutter speed so that the drag mechanism is locked and thereby further operation of stopping down is prevented, said diaphragm control arrangement comprising a planet wheel coupled to the gear train, a braking member adapted to be engaged with said planet wheel and thereby to exert a braking effect thereupon, a brake magnet for control of engagement and disengagement of said braking member with said planet wheel; and
   a timer for controlling the brake magnet, wherein said timer deenergizes the brake magnet a predetermined time after the start of stopping down so as to bring the braking member into engagement with the planet wheel whereby to exert a braking effect upon the drag mechanism so that the operation of stopping down continues at a speed more and more decreasing and, when a right diaphragm value is reached, the diaphragm value control circuit deenergizes the diaphragm control magnet so as to lock the drag mechanism and thereby to prevent further operation of stopping down.

5. A diaphragm control arrangement for a photographic camera having an automatic exposure system of diaphragm value control type, the system having a drag mechanism operatively associated with actuating members which are, in turn, operatively associated with the operation of stopping the objective down from opened state thereof and wherein diaphragm value control is achieved by deenergizing a control magnet so as to stop operation of the drag mechanism, said drag mechanism including a gear train, the diaphragm control arrangement comprising:
   a brake wheel fixed on a shaft of a gear of said gear train;
   a brake magnet;
   a brake member adapted to exert a braking effect upon said brake wheel by deenergizing said brake magnet;
   a differentiation circuit adapted for timely differentiation of output from a photometric circuit which determines an amount of light coming through the lens aperture from an object to be photographed;
   an operational circuit adapted to perform addition of said output of the photometric circuit to the output of said differentiation circuit; and
   a comparator adapted to compare the output of said operational circuit with a $T_V$ value of manually regulated shutter speed; and wherein, upon coincidence of said output of the operational circuit with said $T_V$ value of the manually regulated shutter speed, the brake magnet is cut off and thereby the brake device is actuated.

6. A brake device for diaphragm control in an automatic exposure photographic camera of diaphragm value control type wherein there is provided a drag mechanism operatively associated with actuating members which are, in turn, operatively associated with the operation of stopping down and the diaphragm value control is achieved by deenergizing a control magnet so as to stop operation of the drag mechanism, said drag mechanism consisting of a gear train, said brake device comprising a brake wheel fixed on a shaft of any one of said gears, a brake magnet, a brake member adapted to exert a braking effect upon said brake wheel by deenergizing said brake magnet, a circuit adapted to generate a voltage linearly dropping from a preset voltage $V_a$, an operational circuit adapted to perform addition of the output of said circuit to output of a photometric circuit and a comparator adapted to compare a $T_V$ value of manually regulated shutter speed with the output of said operational circuit, wherein, upon coincidence of said output of the operational circuit with said $T_V$ value of manually regulated shutter speed, the control magnet is controlled.

* * * * *